(12) United States Patent
Taylor

(10) Patent No.: US 6,293,324 B1
(45) Date of Patent: Sep. 25, 2001

(54) TREATED WHEEL RIM

(75) Inventor: Fredrick B. Taylor, Rome, GA (US)

(73) Assignee: FBT Enterprises, Inc., Rome, GA (US)

( * ) Notice: Subject to any disclaimer, the term of this patent is extended or adjusted under 35 U.S.C. 154(b) by 0 days.

(21) Appl. No.: 09/492,049

(22) Filed: Jan. 26, 2000

(51) Int. Cl.$^7$ .............................. B60B 21/00; B60B 25/04
(52) U.S. Cl. .............................................. 152/409; 301/95
(58) Field of Search ................................ 152/409, 410, 152/DIG. 10; 301/95–98

(56) References Cited

U.S. PATENT DOCUMENTS

| | | | |
|---|---|---|---|
| 3,143,377 | 8/1964 | Bulgrin et al. ..................... | 301/63.1 |
| 3,885,615 | 5/1975 | Mitchell ................. | 152/411 |
| 4,341,425 | 7/1982 | Streicher et al. ................... | 301/64.1 |
| 4,363,347 | 12/1982 | Baumgartner ........................ | 152/411 |
| 4,770,220 | 9/1988 | Mori ..................................... | 152/398 |
| 5,240,055 | * 8/1993 | Smith .............................. | 152/410 X |
| 5,259,430 | * 11/1993 | Smith et al. ..................... | 152/409 X |
| 5,335,706 | 8/1994 | Foster ................................... | 152/410 |

FOREIGN PATENT DOCUMENTS

| | | | |
|---|---|---|---|
| 345804 | * 5/1960 | (CH) | ............................ 152/DIG. 10 |
| 1 235 172 | 1/1961 | (DE) . | |
| 1 944 671 | 9/1969 | (DE) . | |
| 25 54 382 | 12/1975 | (DE) . | |
| 490754 | 2/1936 | (GB) . | |
| 2 059 298 | 9/1979 | (GB) . | |
| 2 067 482 | 1/1981 | (GB) . | |

* cited by examiner

Primary Examiner—Russell D. Stormer
(74) Attorney, Agent, or Firm—Thomas, Kayden, Horstemeyer & Risley

(57) ABSTRACT

In a multi-piece wheel rim assembly for a large industrial vehicle, the side rings (40 and 42) are each coated with a layer of carbon steel (60, 69) to form a convex L-shaped bearing surface (56, 66), and the surfaces of the rim base (20) and bead seat (34) which face the side rings are likewise coated with layers of carbon steel (62, 68) to form a concave L-shaped bearing surface (58 and 68), with the sizes and shapes of the bearing surfaces corresponding to each other. The side rings (40, 42) are able to move circumferentially with respect to the rim base and bead seat with reduced fretting and other deterioration of the facing parts.

8 Claims, 2 Drawing Sheets

TREATED WHEEL RIM

FIELD OF THE INVENTION

This invention concerns wheels of large industrial vehicles. More particularly, this invention concerns an improved multi-piece wheel rim having treated facing surfaces to reduce wear of the surfaces in response to prolonged operation of the wheel.

BACKGROUND OF THE INVENTION

Tires for conventional sized automobiles are mounted on metal wheel rims that are essentially of one piece construction. The beads at the inner perimeter of the rubber tire are flexible and stretchable to the extent that they can be slightly deformed so as to pass over the side flanges of the wheel rim and become seated on the rim between the side flanges.

When the size of the rubber tire is increased, the strength of the beads is also increased, usually with the placement of more or stronger steel cords that extend annularly within the beads of the tire. Because of this increased strength capacity, it is much more difficult to stretch and/or deform the beads of large and stronger tires in order to place the beads on a unitary rim structure.

To permit ease of mounting and demounting tires on wheel rim structures, a multiple piece steel rim structure was developed which could be assembled as the tire is being mounted on the rim structure. Typically, the multiple piece rim structure is a five piece rim structure which includes a cylindrical rim base of unitary construction with opposed annular edges. A separately formed back side ring is telescopically mounted on the rim base and held in place on the back section of the rim base by a protruding back flange of the rim base. The tire is then mounted telescopically about the rim base with its back bead engaging the back side ring, and a front side ring is placed about the rim base behind the tire, so that it engages the front bead of the tire. An annular bead seat is telescopically inserted through the front side ring and the front bead of the tire and about the front edge of the rim base, and is held in place by a lock ring which engages a lock ring recess in the rim base. With the tire and the wheel rim assembled in this manner, the tire is inflated and the wheel assembly is ready for mounting to a vehicle.

One of the major problems with the above noted five piece wheel rim when used on a large industrial vehicle which handles heavy loads under stressful circumstances is that there are many instances where the vehicle rapidly accelerates or decelerates and the tire having traction with the ground, resists spinning or skidding with respect to the ground while the wheel rim responds to the drive train or brakes of the vehicle in an attempt to force the tire to rotate or to stop its rotation. This results in relative movement of the rubber tire with respect to the steel wheel rim. More particularly, the frictional engagement between the inner side ring and the rubber tire is sufficient to cause the inner side ring to move in unison with the tire while the rim base moves either faster or slower than the tire and the inner side ring. This causes relative movement between the inner side ring and the rim base, and the result is fretting or deterioration of the steel of the facing surfaces of the inner side ring and the rim base. Over time, the fretting becomes so serious as to cause failure of the inner side ring and/or the rim base. The deterioration can cause air leakage between the parts, partially or complete separation of the parts, and injury to the equipment and to the personnel operating or adjacent the equipment.

The typical five piece steel wheel rim structures which are used for very large vehicles, such as earth movers and large dump trucks weighing 100 tons or more, have a cold tire pressure of over 1000 lb. psi. This tire pressure could easily rise to 1400 lb. psi as the air, tires and wheels heat during use of the vehicle. This tends to build up an enormous potential energy within the tires this size, and there is a hazard that the side flanges of the five piece rim structures could release under the force of the compressed air in the tire, creating extreme risk to people and equipment adjacent the wheel. The release of the side flange could be caused by cracks in the flange or by fretting of the flange which occurs at the facing surfaces of the side flange and rim base.

Moreover, large earth moving vehicles in use today typically run on radial ply tires. Radial tires offer the advantages of being able to handle greater loads at greater speeds. Radial tires have proven to be longer lasting, have better traction, have more even ground pressure which results in better floatation of the vehicle, a smoother ride and improved fuel economy. Radial tires under optimal use and conditions will last sometimes twice as long as bias ply tires.

The advantages of using radial ply tires over bias ply tires is the obvious reason why there has been such a large shift toward using radial tires. However, the use of radial ply tires has necessitated a redesign of the rims used with the tires because of the greater stresses applied to the side rings and back sections of the rim bases.

As illustrated in FIGS. 4 and 5 of the drawings, the forces that act upon a wheel rim are different with bias ply tires and radial ply tires. FIG. 4 illustrates a bias ply tire, and FIG. 5 illustrates a radial ply tire. The lines of force 101 and 102 that act upon the rim in a bias ply tire extend diagonally across the face of the tire. The construction of the tire is crisscrossed layers of tire ply material. The forces of stress induced in the tire generally follow these biased or angled threads of the plies which run at angles to one another. The net result is a stiffer tire side wall and the stresses of the tire at the bottom dead center of the tire are disbursed both radially and circumferentially about the tire at an angle over a wide area of the tire bead and wheel rim. There is less stress applied from the tire to the side rings, since the stress is spread about more of the side rings, and more stress placed on the tire bead mounting area of the rim.

FIG. 5 shows the lines of force 103 and 104 in a radial ply tire, which tend to follow the radially extending cords of the radial plies. The net result is that the lines of force run more radially and less circumferentially and do not criss-cross as much as in the bias ply tire. The result is a softer side wall of the radial ply tire. The stress is concentrated more on the side rings at bottom dead center of the wheel than about the rim and tire bead area. The stress induced on the side rings tends to cause them to flex radially like the tire does. Since the side rings are anchored by the back section interface area, the rim back section area will act as a fulcrum for a side ring under stress that is trying to flex in a radial direction. The net result is significantly greater stress concentrated on smaller areas of side rings and the rim back section interface.

Radial tires mounted on a rim can exert static loads on the rim up to 250% greater to than that of a bias ply tire. This increased load stress can eventually cause rims to fail prematurely. The greatest increase in stress is on the rim's side rings and back section. These stresses can shorten the rim life by as much as 50% to 75%. Previous rim design changes have added more material thickness to the side rings and back section of the rim base. The direct result of these changes was increased rim life. However, two problems were not solved with these changes: rim fretting and rim fatigue.

Fretting is the result of two things. The first cause is radial stress from using radial tires. The second cause is from the side ring "walking" around the rim, as previously described. This results from: the rotation of the rim or the wheel, the side ring not being fixed to the rim base, and the tires tendency to move minute amounts about the rim base during acceleration and deceleration of the vehicle. The air pressure in the tire exerts thousands of pounds per square inch of pressure and force on the side ring. The side ring is, as a result, pushed against the back flange interface area. The back flange, being relatively fixed, exerts force back on the side ring. When the tire begins to "walk" circumferentially on the rim, the side ring moves with the tire, not with the rim base. It is not uncommon to have a tire and side flange walk a distance of ten inches in an eight hour shift in haul truck applications at a mine site. At the point where the side flange and the rim back section interface, fretting will begin to take place in minute amounts. It is the net accumulation of this fretting that leads to the eventual wear on the rim back flange. If left unchecked, this wear can result in cracks in the rim and excessive wear and premature failure of the side rings. All of these problems result in increased operating costs to the end user, which is something all end users are interested in reducing.

The problem of the side ring walking about the rim base has not been solved. Attempts have been made to stop the flange from walking by using "flange locks." These locks are welded on the rim back section along with a mating lock welded onto the side flange. This has proven to be unsuccessful. In the applications tested, the net result has been that some of the flange locks were literally torn off the rim back flange because of the circumferential forces applied by the tire to the rim. In some cases, the rim back flanges were under such stress that the area surrounding the flange locks developed fractures and failure occurred in that sections of the rim back flange were sheared off. In other instances, the flange locks welded to the side rings also sheared off as a result of the stress placed on them.

Repair of the rim base involves cutting or machining off the rim back flange and replacing it with a new flange. Repair of the rim base is only an option if the rim is in otherwise good condition.

Another problem that occurs is side ring wear. The side ring wear is the result of abrasive aggregates getting down between the side ring and the tire. Over time, this aggregate grinds away at the side ring and causes a thinning of the ring material. This is an accepted problem and is a reason so many of the components are replaced. Side rings are a minimal cost when compared to the cost of a rim base or entire wheel.

SUMMARY OF THE INVENTION

Specifically, this invention addresses the problem associated with big rims and radial tires mounted on such big rims. Briefly described, this invention involves the reduction of fretting and other types of wear between the back side ring and the back flanges of a steel rim assembly of a large wheel for large industrial vehicles. The back side ring of a multipiece rim assembly for a large wheel is shaped so as to nest with and bear against a complementary shaped bearing surface or back flange formed on the rim base. A similar arrangement is utilized for the opposite or font side ring which bears against the flange of the bead seat.

The side ring is an annular structure which, in cross-section, includes a radially extending rim bearing leg and an axially curved bead support leg that has opposed convex and concave surfaces. The inner circumferential surface of the side ring functions as an inner annular bearing surface which faces and engages the rim base. The surface of the bearing leg of the side ring on the same side of the side ring as its concave surface functions as a laterally facing bearing surface which faces and engages the back flange of the rim base. This laterally facing bearing surface intersects the inner annular bearing surface and together form a convex L-shaped bearing surface which engages a complementary shaped concave L-shaped bearing surface formed at the intersection of the rim base and its back flange.

The complementary L-shaped bearing surfaces of the side ring and rim base are coated with molten carbon steel so as to form hardened bearing surfaces that are more durable than the steel of the wheel rim and side rings. The amount of friction experienced as a result of the slippage of the side ring with respect to the rim base can be controlled by the surface texture of the hardened carbon steel bearing surfaces applied to the facing structures. The carbon steel bearing surfaces are much more durable than the typical steel surfaces of a prior art rim base and side ring in response to fretting and other deterioration normally experienced by the rim assembly. The shapes of the hardened steel surfaces of the side ring and rim base are complementary, so that they tend to nest together. The breadth of the coating of carbon steel on these complementary surfaces extends beyond the limits of the facing surfaces, so that the entire contact made by the side ring with the rim base is shielded by the hardened bearing surfaces.

A similar carbon steel coating can be used on the facing L-shaped bearing surfaces of the bead seat and its side ring.

Thus, it is an object of this invention to provide an improved wheel rim for large and heavy industrial vehicles which is more durable and safe to operate.

Another object of this invention is to provide a wheel rim having certain surfaces coated with carbon steel so as to reduce the fretting and other wear characteristics experienced by the components of the wheel due to relative movement of the tire with respect to the rim base of the wheel.

Another object of the invention is to provide an improved wheel assembly for a large industrial vehicle which is inexpensive to maintain, which is more durable than the prior art wheel assemblies, and which is safe to operate.

Other objects, features and advantages of the present invention will become apparent upon reading the following specifications, when taken in conjunction with the accompanying drawings.

DETAILED DESCRIPTION

Figure 1:
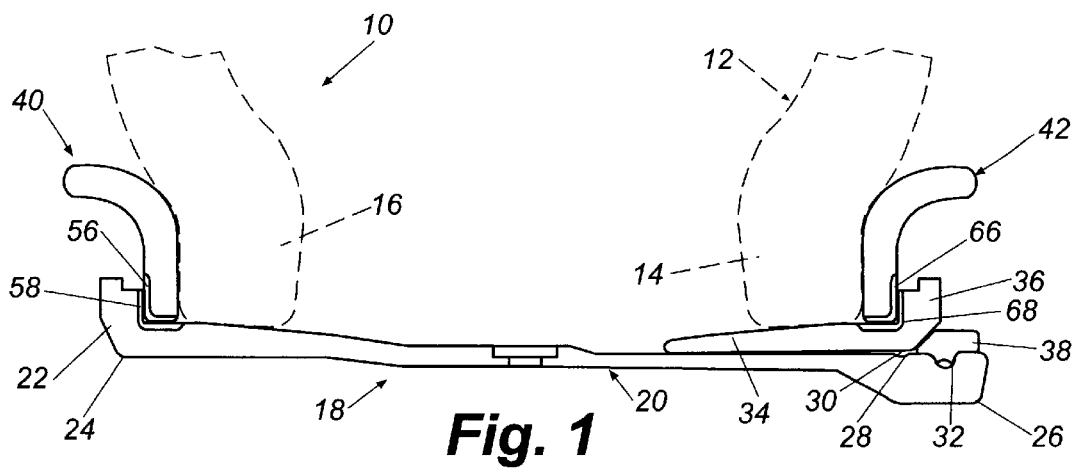
FIG. 1 is a cross sectional view of a five piece wheel rim for a large industrial vehicle, showing a portion of a tire that is mounted on the wheel rim assembly.

Referring now in more detail to the drawings, in which like numerals indicate like parts throughout the several views, FIG. 1 illustrates a wheel 10 of a large industrial vehicle which includes a tire 12 having annular beads 14 and 16. The beads of the tire are mounted on a five piece wheel rim assembly 18 which includes a rim base 20, with the rim base including a first rim back flange 22. The rim base is substantially cylindrical and includes opposed first and second annular edges 24 and 26, with the rim back flange 22 positioned at annular edge 24 and extending radially from the rim base. Second annular edge 26, also known as the gutter section, defines an O-ring recess 28 which receives an O-ring 30, and a lock ring groove 32. Annular bead seat 34 telescopically extends about rim base 20 and includes a second rim back flange 36 that extends radially from the bead seat. Lock ring 38 has its protrusion extending into the lock ring groove 32 of the rim base 20, holding the bead seat 34 in place on the rim base.

A back side ring 40 is telescopically mounted about rim base 20 and is positioned adjacent the first rim back flange 22. The front side ring 42 is telescopically mounted about both the rim base 20 and the bead seat 34, and bears against the bead seat.

Preferably, the side rings 40 and 42 will be identical in size and shape, dependent upon the sizes and shapes of the rim base and bead seat.

Figure 2:
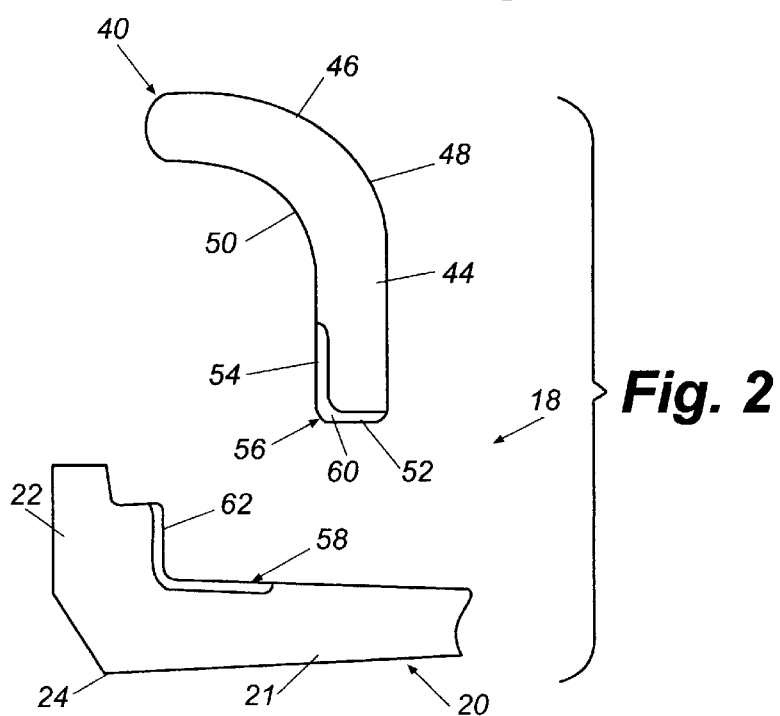
FIG. 2 is an exploded cross sectional view of a back annular side ring and a portion of the rim base and its rim back flange, showing the carbon steel coated complementary shaped bearing surfaces of these components.

As illustrated in FIG. 2, side ring 40 includes, in cross section, a radially extending support leg 44 and curved, axially extending bead support leg 46. A convex surface 48 is formed on one side of the ring, and a concave surface 50 is formed on the other side of the ring. The inner surface 52 of the side ring 40 functions as a bearing surface which bears against the rim base 20, and the adjacent surface 54 on the concave side of the support leg 44 also functions as a bearing surface, and the bearing surfaces 52 and 54 form a convex L-shaped bearing surface 56 for engaging the rim base 20 and its back flange 22.

The rim base 20 includes a concave L-shaped bearing surface 58 formed at the intersection of the cylindrical portion 21 of the rim base with the back flange 22 of the rim base. The L-shaped bearing surfaces 56 and 58 are complementary in size and shape.

The L-shaped bearing surfaces 56 and 58 are each coated with a layer of carbon steel 60 and 62, respectively, with a layer of carbon steel being substantially coextensive with the adjacent exterior surfaces of the side ring and rim base, respectively.

The hardened surface formed by the carbon steel is significantly harder than the steel material of the five piece wheel rim assembly. The bearing surfaces 56 and 58 as formed by the layers of carbon steel 60 and 62 are of a breadth so that only the bearing surface of the side ring will contact only the bearing surface of the rim base. Therefore, the friction experienced by the side ring and by the rim base from the relative movement of the side ring with respect to the rim base will be experienced only by the hardened steel bearing surfaces.

Figure 3:
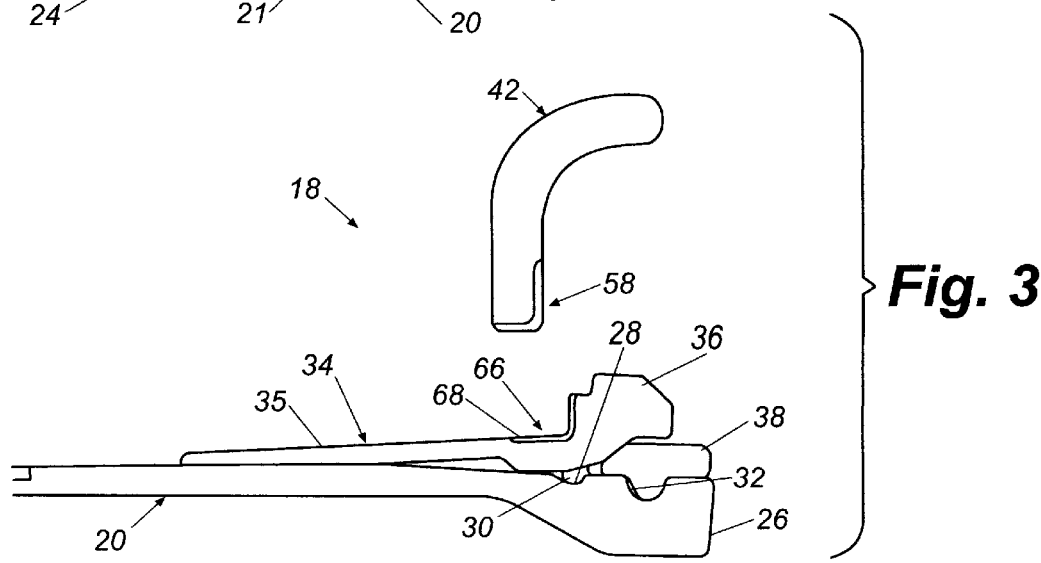
FIG. 3 is an exploded view of the front annular side ring and the bead seat which is mounted on the rim base, and the lock ring that holds the bead seat in place on the rim base. The carbon steel coated complementary shaped bearing surfaces are shown on the side ring and bead seat.
Figure 4:
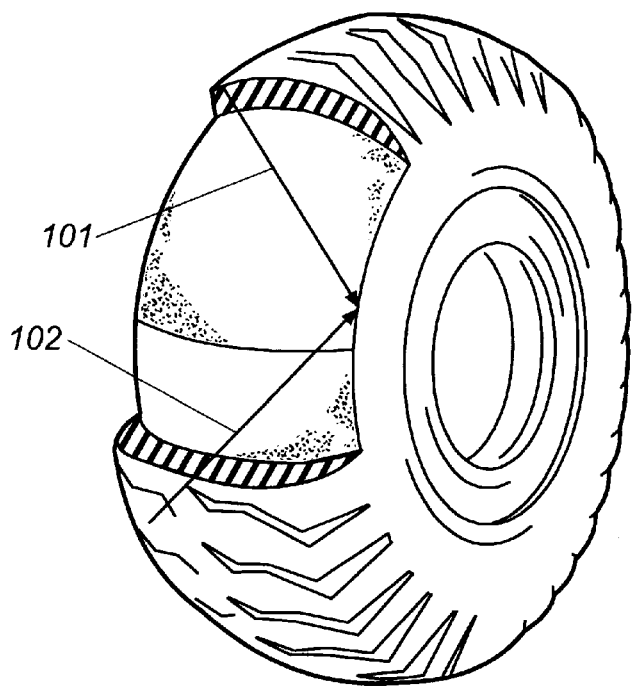
FIGS. 4 and 5 are perspective illustrations of prior art wheels for large industrial vehicles, with the treads of the tires cut away to show bias ply in FIG. 4 and radial ply in FIG. 5 and the forces applied by the weight of the vehicle on the wheel rims.
Figure 5:
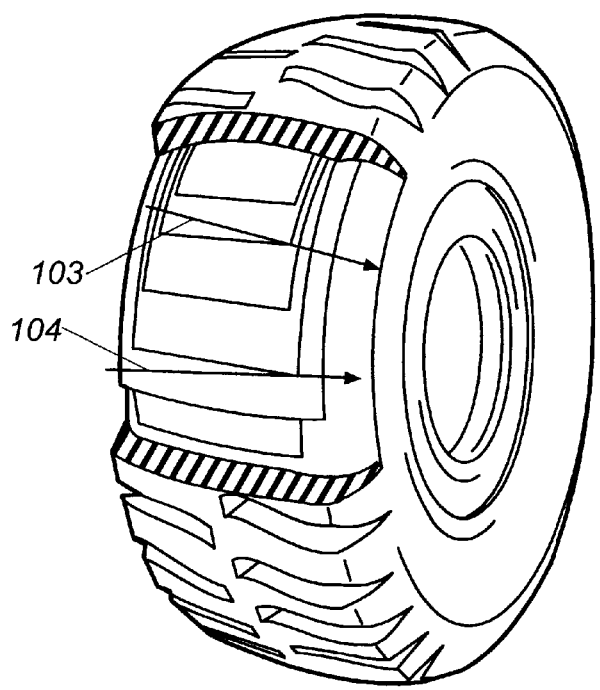

As illustrated in FIG. 3, a similar bearing arrangement can be utilized with respect to the bead seat 34. The L-shaped intersection of the back flange 36 with the cylindrical portion 35 of the bead seat forms a concave L-shaped bearing surface 66 which has a layer of carbon steel 68 applied thereto to form a hardened bearing surface. The front side ring 42, which in this instance is identical to the back side ring 40, has its L-shaped bearing surface 58 nest with the bearing surface 66 as previously described. Again, the breadth of the two bearing surfaces 58 and 66 are such that only the bearing surfaces contact each other, thereby avoiding contact of the other adjacent surfaces of the side ring and bead seat.

If desired the amount of friction experienced from relative movement between the side rings and the rim base or bead seat can be controlled by the texture of the surfaces of the L-shaped bearing surfaces.

It will be noted that the invention has been described as being incorporated in a five piece wheel rim, but it should be understood that the invention can comprise other multiple piece wheel rims that have more than or less than five pieces.

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. In a steel wheel rim for an industrial vehicle having a substantially cylindrical rim base including first and second opposed annular edges, a first rim back flange formed on a first annular edge of said rim base and forming with said rim base a first L-shaped concave bearing surface a bead seat telescopically mounted on said rim base at said second annular edge of said rim base, a second rim back flange formed on said bead seat and forming with said bead seat a second L-shaped concave bearing surface, a back side ring telescopically and rotatably mounted on said rim base and bearing against said first concave bearing surface, a front side ring telescopically mounted on said bead seat and bearing against said second concave bearing surface, said back and front side rings each being formed with an inner annular bearing surface for bearing against said rim base or said bead seat a convex annular bead support surface for supporting the bead of a tire, and a side bearing surface opposed to said convex annular bead support surface intersecting said inner annular bearing surface, said inner annular bearing surface and said side bearing surface of each of said side rings forming an L-shaped in cross section, convex annular bearing surface each sized and shaped to nest with said concave bearing surfaces of said rim base and said bead seat, the improvement therein comprising:
at least one of said concave bearing surfaces and the convex bearing surface of its side ring both being coated with a metallic carbon layer of a hardness greater than the hardness of said steel of said wheel rim and said side rings.

2. In the wheel rim according to claim 1, wherein the at least one of said concave bearing surfaces comprises said first concave bearing surface of said rim base and said rim back flange.

3. The wheel rim according to claim 2, wherein said coating is coextensive with the surfaces of said rim back flange and said rim base.

4. In the wheel rim according to claim 1, wherein the at least one of said concave bearing surfaces comprises said second concave bearing surface of said bead seat and said bead seat back flange.

5. The wheel rim according to claim 4, wherein said coating is coextensive with the surfaces of said bead seat and said bead seat back flange.

6. In the wheel rim according to claim 1, wherein the at least one of said concave bearing surfaces comprises both the concave bearing surface of said rim base and the concave bearing surface of said bead seat.

7. A steel wheel rim for an industrial vehicle comprising:

a rim base having a back flange with a back flange bearing surface, a side ring telescopically mounted about said rim base and having a side ring bearing surface bearing against said back flange bearing surface, and said back flange bearing surface and said side ring bearing surface each being coated with a hardened metal which is harder than the steel of said wheel rim, said coatings of hardened metal on said back flange bearing surface and on said side ring bearing surface being coextensive.

8. The wheel rim according to claim 7, wherein said coatings of said back flange bearing surface and said side ring bearing surface are L-shaped and nest together.

* * * * *